Patented July 6, 1954

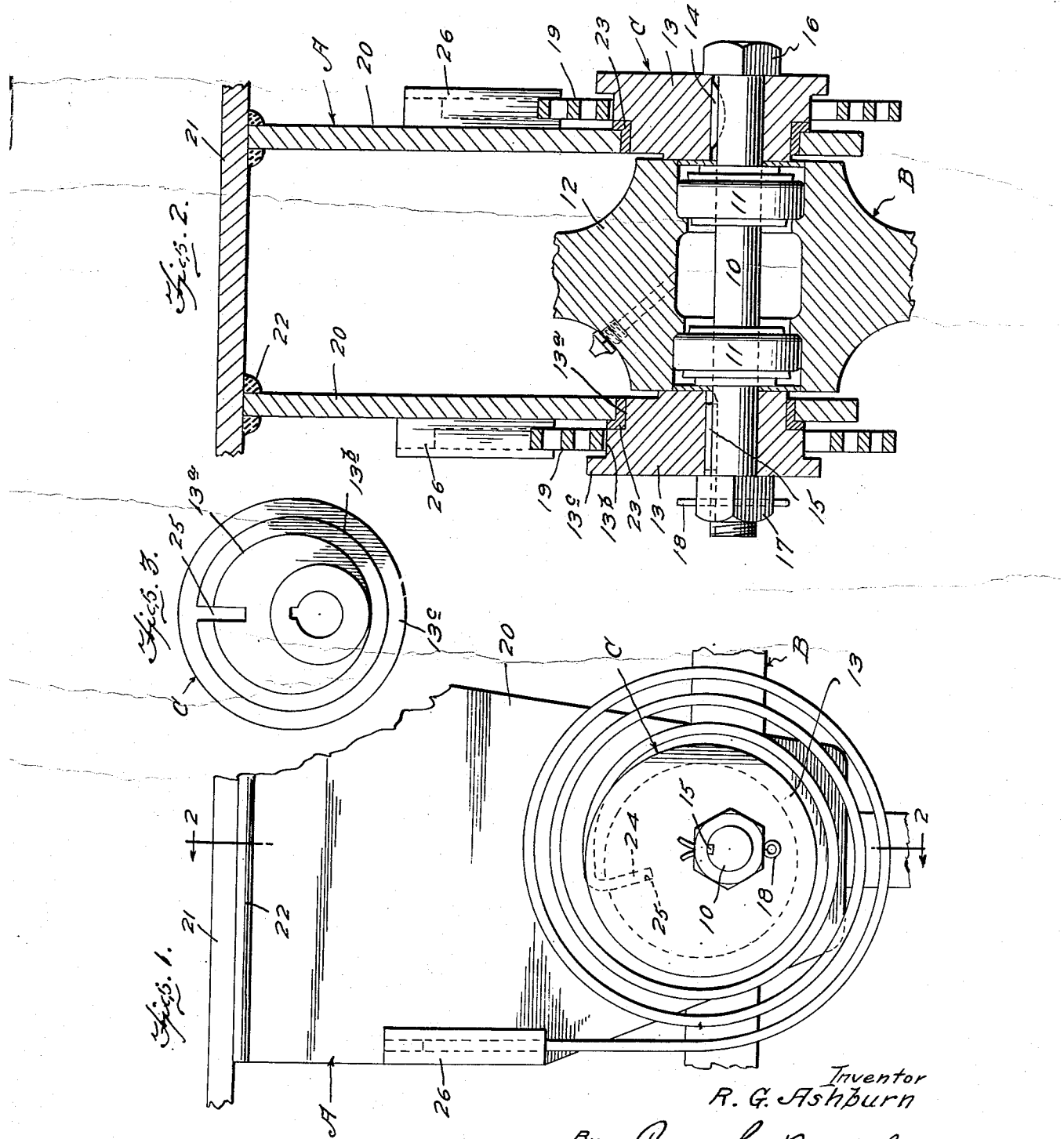

2,683,033

UNITED STATES PATENT OFFICE 2,683,033

INDEPENDENT WHEEL SUSPENSION

Roby Glenn Ashburn, Mount Airy, N. C.

Application May 13, 1952, Serial No. 287,469

4 Claims. (Cl. 267—59)

The object of the invention is to provide a wheel suspension for vehicular use, particularly on trucks, that will cushion the wheel in moving over obstructions and depressions in the surface over which the truck or vehicle may be traveling; to provide a wheel suspension that will function to execute a simple harmonic motion in operation, so that shocks are absorbed without suddenness; to provide a wheel suspension in which there is no obstruction in the path of movement of the vehicle in responding to a shock; and generally to provide a device of the kind indicated which is of simple form, susceptible of comparatively cheap manufacture, and of a character unlikely to get out of order in use.

With this object in view, the invention consists in a construction and combination of parts of which a perferred embodiment is illustrated in the accompanying drawings, wherein:

Figure 1 is a side elevational view of the invention;

Figure 2 is a sectional view on the plane indicated by the line 2—2 of Figure 1;

Figure 3 is an elevational view, looking at the inner face, of one of the hubs constituting an element of the wheel carriage.

The essential elements of the invention are the bracket A, the carriage C, and the wheel B, the latter being rotatably mounted on the shaft 10 with an anti-friction bearing 11 interposed between it and the wheel hub 12. The bearing is preferably of the well-known Timken type. The shaft 10 may be, and preferably is, a machine bolt and carries the hub discs 13 which are keyed to it, as indicated at 14 and 15, the well-known Woodruff key being employed to secure the disc adjacent the head 16 and a flat key to secure the disc adjacent the nut 17, which when attached to the bolt, is secured against turning by an appropriate key, as for example, a cotter pin 18. The hub discs 13 are of step form, the steps being of progressively reduced diameter with the step 13a being a journal step, the step 13b being the spring seat step and the step 13c constituting a lateral guard flange for the spring 19. The several steps of the discs are concentric but they are eccentric to the eyes through which the shaft 10 passes, so that the hub journals and wheel B rotate on relatively eccentric axes.

The bracket in which the carriage is mounted may consist of spaced arms 20 joined at their upper ends by an appropriate web or it may consist merely of the arms themselves secured to the truck platform 21, as by welding as shown at 22 in Figure 2 of the drawings. The arms at their lower ends are formed with openings receiving graphite bronze bearings 23 and in these the journal steps of the hubs are received, so that the hubs may rotate in the bracket arms. When so doing, however, it is against the twisting or torsional effect of the springs 19 which are of the flat spiral form, the terminals of the inner convolutions being bent radially inwardly, as indicated at 24 to enter the slots 25 in the hub discs. The terminal of each outer convolution enters a sleeve 26 formed on the outer face of each bracket arm.

The springs are so wound that normally the hub discs stand at a position slightly beyond dead center, that is, they are so positioned that shaft 10 is substantially at the lowest point which it may reach when the carriage vibrates. Thus, when the wheel is subjected to a shock, the tendency is to raise the shaft, rotate the hub discs and wind up the springs, this winding imparted to the springs absorbing the shock. If the shock be great enough, the discs may be rotated more than a half a revolution, or for that matter more than a whole revolution, but, there will be no obstruction in the path of movement of the carriage and thus the shock of the wheel will be absorbed without suddenness, no matter how great it may be. Since the hub discs rotate on one axis and the shaft swings the body around that axis, the effect of the vertical movement of the shaft is to execute a simple harmonic motion, that is, the carriage executes a simple harmonic motion in absorbing shocks. Further, the form of the carriage and its manner of mounting make for freedom of movement of the carriage in performance of its functions since there never can be a time when it may impinge on some other part of the vehicle, as in the case of conventional wheel mountings.

The step 13b of the hub discs, being exterior to the bracket arms, the latter and the flanges 13c act as guards for the springs.

The slots 25 formed in the hub discs are cut through the journal step, so that the inner end of the springs may be seated in the assembling operation.

The invention having been described, what is claimed as new and useful is:

1. A device of the kind indicated comprising a wheel, a carriage composed of peripherally stepped spaced discs and a connecting shaft on the latter of which the wheel is rotatably mounted between said discs, the shaft being fixed to said discs within the peripheries of the lesser steps but eccentrically of the axis thereof, spaced arms in which the lesser steps of the discs are rotatably mounted with the greater steps laterally abutting them, and torsion springs terminally anchored respectively to said discs and to said arms.

2. A device of the kind indicated comprising a wheel, a carriage composed of peripherally stepped spaced discs and a connecting shaft on the latter of which the wheel is rotatably mounted between said discs, the shaft being fixed to said discs within the peripheries of the lesser steps but eccentrically of the axis thereof, spaced arms in which the lesser steps of the discs are rotatably mounted with the greater steps laterally abutting them on their exterior faces, and spiral torsion springs in surrounding relation to the greater steps and having their terminals anchored respectively to said steps and to said arms.

3. A device of the kind indicated comprising spaced bracket arms, step discs of which one step of each constitutes a journal, the two journals being rotatably mounted in the two bracket arms respectively, a shaft spanning and keyed to the two discs with its axis eccentric to the axes of the discs, a wheel rotatably mounted on the shaft between the discs and torsion springs surrounding the second steps of the discs and terminally anchored to the bracket arms and discs respectively, the springs being in the form of flat spirals exterior to the bracket arms.

4. A device of the kind indicated comprising spaced bracket arms, spaced discs of which one step of each constitutes a journal, the two journals being rotatably mounted in the two bracket arms respectively, a shaft spanning and keyed to the two discs with its axis eccentric to the axes of the discs, a wheel rotatably mounted on the shaft between the discs, the discs having second and third steps exterior to the bracket arms, and torsion springs surrounding the second steps of the discs with their terminals anchored to the discs and bracket arms respectively, the springs being in the form of flat spirals to which the third steps of the discs act as lateral guards.

References Cited in the file of this patent

UNITED STATES PATENTS

| Number | Name | Date |
|---|---|---|
| 2,285,656 | Herold | June 9, 1942 |
| 2,544,924 | Herold | Mar. 13, 1951 |

FOREIGN PATENTS

| Number | Country | Date |
|---|---|---|
| 151,665 | Great Britain | Oct. 7, 1920 |